United States Patent Office 2,901,501
Patented Aug. 25, 1959

2,901,501

PROPANEDIOL BIS(THIOCARBAMATES)

Burton Kendall Wasson, Valois, Quebec, and John Mulvin Parker, Montreal, Quebec, Canada, assignors to Charles E. Frosst & Co., Montreal, Quebec, Canada, a corporation of Canada No Drawing. Application February 3, 1958
Serial No. 712,672

2 Claims. (Cl. 260—455)

The present invention relates to a new class of organic sulphur-containing compounds and to a method for preparing them.

The compounds of the present invention may be represented by the following general formula

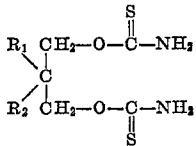

wherein $R_1$ and $R_2$ represent hydrogen, lower alkyl and cycloalkyl of less than 7 carbon atoms, alkenyl, alkynyl and aryl radicals, but when $R_1$ is hydrogen, $R_2$ cannot be hydrogen. As an example of suitable lower alkyl radicals there may be mentioned, methyl, ethyl, n-propyl; as cycloalkyl radicals there may be mentioned cyclopentyl and cyclohexyl; as alkynyl, there may be mentioned allyl, methallyl and propargyl; and as aryl there may be mentioned phenyl and substituted phenyl radicals.

The compounds of the present invention are obtained by the reaction of a 2,2-disubstituted propanediol of the general formula

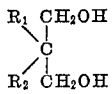

wherein $R_1$ and $R_2$ are as defined above, with thiophosgene to the corresponding bis(thiochlorocarbonates) which are subsequently reacted with ammonia whereby there are obtained the novel products of the present invention.

The products of the present invention have been found to possess novel therapeutic properties particularly in the field of psychotropic action. For example, 2-methyl-2n-propyl-1,3-propanediol bis(thicarbamate) has been found to tranquilize and produce muscular relaxation in animals about nine times more rapidly than its oxygen analogue without any decrease in the duration of the effect. Furthermore, the bitter taste of its oxygen analogue, 2-methyl-2n-propyl 1,3-propanediol dicarbamate is virtually absent, thus rendering the product more palatable, thereby obviating the necessity of special coatings which are required in the commercial sale of the oxygen analogue.

Rapidity of action of compounds of general formula:

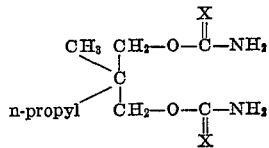

Rats, 250 mg./kg.

[Times (minutes) after administration.]

| Effect | X=O Compound | X=S Compound |
|---|---|---|
| Staggering | 8 min | 1¼ min. |
| Limp | 9 min | 2 min. |
| Immobile | 18 min | 2½ min. |
| Moving from tail pinch | 35 min | 1 hour, 50 min. |
| Raising head | 2 hours | 2 hours. |
| Able to move | 4 hours | 4 hours. |

These results show conclusively that the novel thiocarbamates are distinctly more rapid in their action than the corresponding oxygen analogues while providing muscle relaxation and sedation for an equivalent length of time.

Example.—A solution of 2-methyl-2-n-propyl-1,3-propanediol in 30 cc. of tetrahydrofuran was added slowly to a solution of 11.5 grams of thiophosgene in 50 cc. tetrahydrofuran at 27° C. while stirring. The temperature rose during the addition to 30° C. and remained at this temperature for about one hour. This solution was left at room temperature overnight. The red solution containing the 2-methyl-2-n-propyl-1,3-propanediol bis (chlorothiocarbonate) was added slowly to 75 cc. concentrated ammonium hydroxide at —5° C. to 5° C. Considerable heating occurred during this addition.

The mixture was stirred at room temperature for two hours. The tetrahydrofuran was removed in vacuo at a bath temperature not higher than 65° C. The aqueous mixture was diluted with water and extracted with ether. The combined ether extracts were washed with water, dried and the ether removed to give 9.5 grams of solid material. These solids were dissolved in ether, treated with charcoal at room temperature, the solution filtered, the ether solution concentrated to half volume and petroleum ether added to give 6.7 grams of 2-methyl-2-n-propyl-1,3-propanediol bis(thicarbamate) as a white crystalline solid of M.P. 94–98° C. Recrystallization from ether-petroleum ether raised the melting point to 101–103° C. The mixed melting point with the oxygen analogue, 2-methyl-2-n-propyl-1,3-propanediol bicarbamate, lowered the melting point to 77–85° C. The infrared spectrum using a potassium bromide pellet showed maxima at the following wave lengths: 3310, 3190, 2960, 1627, 1472, 1432, 1403, 1372, 1310, 1297, 1278, 1202, 1167, 1096, 1060, 1008, 979, 947, 932, 908, 747 and 644 cm.$^{-1}$.

In a similar manner there may be prepared the corresponding di(thiocarbonate) from the following starting compounds: 2-propyl-1, 3-propanediol, 2-allyl-1,3-propanediol, 2-methyl-1,3-propanediol, 2-propargyl-1,3-propanediol, 2-phenyl-1,3-propanediol, 2-cyclopentyl-1,3-propanediol, 2-cyclohexyl-1,3-propanediol, 2-methyl-2-propyl-1,3-propanediol, 2-methyl-2-allyl-1,3-propanediol, 2-methyl-2-methallyl-1,3-propanediol, 2-methyl-2-propargyl-1,3-propanediol, 2-methyl-2-cyclopentyl-1,3-propanediol, 2-methyl-2-cyclohexyl-1,3-propanediol, 2,2-dipropyl-1,3-propanediol, 2-propyl-2-allyl propanediol, 2-propyl-2-methallyl-1,3-propanediol, 2-propyl-2-propargyl-1,3-propanediol, 2-propyl-2-cyclohexyl-1,3-propanediol, 2-propyl-2-phenyl-1,3-propanediol, 2-2-diallyl-1,3-propanediol, 2-allyl-2-methallyl-1,3-propanediol, 2-allyl-2-propargyl-1,3-propanediol, 2-allyl-2-cyclohexyl-1,3-propanediol, 2-allyl-2-phenyl-1,3-propanediol, 2,2-dipropyl-1,3-propanediol, 2-propyl-2-methallylpropanediol, 2-propyl-2-cyclopentyl-1, 3-propanediol, 2-propyl-2-phenyl-1,3-propanediol.

We claim:
1. A substituted 1,3-propanediol of the general formula:
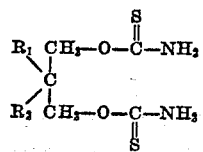
wherein $R_1$ and $R_2$ stand for lower alkyl radicals.
2. 2-methyl-2n-propyl-1,3-propanediol bis(thiocarbamate) of the formula:
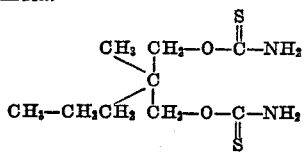
References Cited in the file of this patent
Riemschneider et al.: Chimica e industria 34, 353 (1952).